United States Patent [19]
Matsuzaki et al.

[11] Patent Number: 5,440,701
[45] Date of Patent: Aug. 8, 1995

[54] DATA PROCESSING APPARATUS FOR SHORTENING AN INSTRUCTION CODE LENGTH

[75] Inventors: Toshimichi Matsuzaki, Mino; Masashi Deguchi, Nara, both of Japan

[73] Assignee: Matsushita Electric Industrial Co., Ltd., Osaka, Japan

[21] Appl. No.: 932,652

[22] Filed: Aug. 20, 1992

[30] Foreign Application Priority Data

Aug. 21, 1991 [JP] Japan .................................. 3-209112

[51] Int. Cl.$^6$ ............................................... G06F 9/30
[52] U.S. Cl. ............................. 395/375; 364/DIG. 1; 364/DIG. 2; 364/259; 364/259.2; 364/260.4; 364/260.6; 364/260.7; 364/262.4; 364/262.81; 364/946.2; 364/951.1; 364/951.3
[58] Field of Search ............... 395/800, 650, 550, 375; 364/DIG. 1, DIG. 2

[56] References Cited
U.S. PATENT DOCUMENTS

| | | | |
|---|---|---|---|
| 4,236,206 | 11/1980 | Strecker et al. | 395/375 |
| 4,250,545 | 2/1981 | Blahut et al. | 395/375 |
| 4,274,138 | 6/1981 | Shimokawa | 395/800 |
| 4,432,056 | 2/1984 | Aimura | 395/375 |
| 4,454,578 | 6/1984 | Matsumoto et al. | 395/375 |
| 4,481,571 | 11/1984 | Pilat et al. | 395/375 |
| 4,853,845 | 8/1989 | Zimmer et al. | 395/550 |
| 4,890,218 | 12/1989 | Bram | 395/375 |
| 5,129,087 | 7/1992 | Will | 395/650 |

OTHER PUBLICATIONS
A study of an Architecture of a Control Micro Processor, by N. Higaki et al., Oct. 21, 1991, Matsushita Electric Co., Ltd. Info. System Research Inst.
Newspaper article of Jun. 24, 1992, in "Kagaku Kougyou Nippou".
Newspaper article of Jun. 29, 1992, in "Kagaku Kougyou Nippou".
Newspaper article of Jun. 24, 1992, in "Nihon Kogyou".
Newspaper article of Jun. 24, 1992, in "Nikkei Sangyou".
Newspaper article of Jun. 24, 1992, in "Nikkan Kougyou".
Newspaper article of Jun. 24, 1992, in "Denpa Newspaper".
"Instruction Execution Conditioned on Operand Addresses", by G. L. Baker et al., IBM Technical Disclosure Bulletin, vol. 24, No. 8, Jan. 1982.
"Add Halfword Immediate and Test Instruction", by F. Rubin, IBM Technical Disclosure Bulletin, vol. 13, No. 5, Oct. 1970.

Primary Examiner—Robert B. Harrell
Attorney, Agent, or Firm—Price, Gess & Ubell

[57] ABSTRACT

Disclosed is a data processing apparatus comprising a decode device for decoding an instruction code including an operation code and two register designation codes and an instruction execution device for executing appropriate process according to the results decoded by the decode device, wherein the instruction execution device executes a first process when the two register designation codes are different from each other and executes a second process when they are equal.

8 Claims, 4 Drawing Sheets (a)

| Instruction code | Constructions of instruction codes | Types of instructions | Operations | |
|---|---|---|---|---|
| 0***DnDm (n≠m) | (a) | [R-R] | according to the values of ***<br>MOV<br>ADD<br>SUB<br>CMP<br>ADDC<br>SUBC<br>AND<br>OR | |
| 0***DnDm+imm8 (n=m) | (b) | [imm8-R] | same as above | |
| 1000DnAm | (a) | [LD] | Move from memory to data registers | Addressees |
| | | | | @ Am |
| 1001DnAm+d8 | (b) | | | @ (Am, d8) |
| 1010DnAm (m≠3) | (a) | | | @ (Am, D0) |
| 1010DnAm+abs8 (n=0, m=3) | (b) | | | @ abs8 |
| 1100DnAm | (a) | [ST] | Move from data registers to memory | Addressees |
| | | | | @ Am |
| 1101DnAm+d8 | (b) | | | @ (Am, d8) |
| 1110DnAm (m≠3) | (a) | | | @ (Am, D0) |
| 1110DnAm+abs8 (n=0, m=3) | (b) | | | @ abs8 |
| 1011**Dn | (c) | [R] | according to the values of **,<br>ASR<br>ASL<br>ROR<br>ROL | |
| 1111**Dn | (c) | | according to the values of **,<br>NOT<br>INC<br>DEC<br>PI | |

DATA PROCESSING APPARATUS FOR SHORTENING AN INSTRUCTION CODE LENGTH

BACKGROUND OF THE INVENTION (1) Field of the Invention

This invention relates to a data processing apparatus, which is referred to as a central processing unit (CPU), a microprocessor or the like.

(2) Description of the Related Art

Some conventional data processing apparatuses are constructed so that memory is exclusively used as the operand of operations by operational instructions. In such apparatuses, predetermined operations are executed on the basis of an instruction consisting of an operation code indicating the type of the operation, two operand addresses indicating the locations of data in the memory, for example, a source operand address and a destination operand address.

Some conventional data processing apparatuses are provided with a register called an accumulator and other registers also, the accumulator being implicitly used as an operand. In such apparatuses, operations are executed on the basis of an instruction consisting of a single register designation code indicating the register to operate besides the accumulator.

Other conventional data processing apparatuses are provided with general-purpose registers, any of which can be combined to be the operands and operations are executed on the basis of an instruction consisting of an operation code indicating the type of an operation and two register designation codes indicating the register to operate. However, according to the firstly-mentioned apparatuses using memory exclusively as the operand, the instruction word is rather long because it demands an operand field having bit-length to accommodate two operand addresses. As a result, programs written by the use of such apparatuses tend to be large-sized.

According to the secondly-mentioned apparatuses provided with an accumulator, the instruction word can be short because the instruction merely needs a register field which can accommodate a single register designation code whose bit-length is shorter than that of the operand address. However, operations are assigned mainly to the accumulator, so that frequent moves of data are required between the accumulator and either the other registers or the memory. Such an increase in the number of instructions to be written in programs may decrease the speed of process of the programs as well as increase the program sizes.

According to the last-mentioned apparatuses provided with general-purpose registers, the number of instructions to be written in programs can be fairly decreased because any combination of the registers can be the operands. The instruction word can be comparatively short because the bit-length of the register designation code to be used is shorter than that of an operand address.

Nevertheless, it is difficult for such apparatuses to be constructed so that the sizes of programs can be minimized both by various kinds of operations being executed and they are executed in short instruction word length because of the following problem:

When a data processing apparatus is provided with, for example, 8 general-purpose registers, the bit-length of the register designation code to specify a register is made 3 bits; the instruction requires a 6-bit register field. Thus, an 8-bit instruction word length is not practical because usable instructions in that case are at most 4 types while 16-bit instruction word length is actually demanded to get sufficient numbers of instructions types.

SUMMARY OF THE INVENTION

In view of the above problem, the object of this invention is to provide a data processing apparatus, which can minimize the sizes of programs by various types of operations being executed in a short instruction word length.

The above object can be achieved by a data processing apparatus comprising a decode device for decoding an instruction code including an operation code and two register designation codes and an instruction execution device for executing appropriate process according to the results decoded by the decode device, wherein the instruction execution device executes a first process when the two register designation codes are different from each other and executes a second process when they are equal.

The instruction execution device may comprise an inquiry device for inquiring as to whether the two register designation codes are different from each other or equal and a control device for controlling the first and second processes so that they can be selective according to the results inquired by the inquiry device.

If the first process were assigned to a register data move process in which a source register and a destination register are identical, the value of the register would be the same as the value before the execution, however, this type of process is hardly required. Therefore, in such a case, two different processes can be assigned to a single operation code by allowing the instruction code to execute the second process.

Another example of the first process is that if it were assigned to an operation like an adding operation of data stored in the register, the results would be the same as the results obtained by another execution such as arithmetic shift left. Such a process is also hardly required, so that a single operation code can be made to be assigned two different processes, like the above example.

Thus, according to the above constructions, various types of operations can be executed in a short instruction word length, and the sizes of programs can be minimized.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 5 is a table showing examples of assigning different operations to different instruction codes.

DESCRIPTION OF THE PREFERRED EMBODIMENT

The embodiment of this invention is described as follows with reference to FIGS. 1 through 5.

Figure 1:
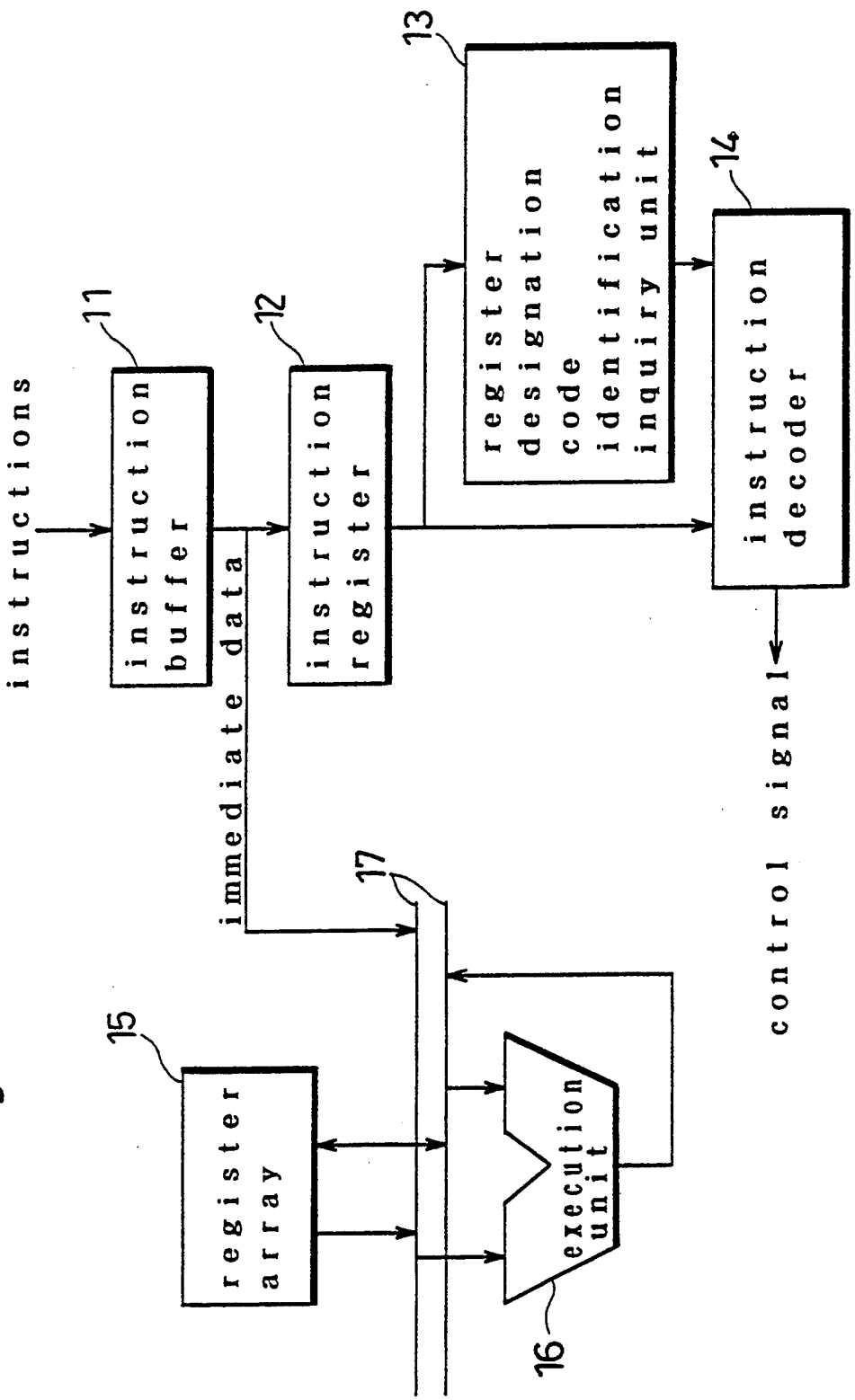
FIG. 1 is a block diagram showing the construction of the main part of a data processing apparatus of this invention.

FIG. 1 includes components 11–17. The instruction buffer 11 temporarily stores instructions fetched from an unillustrated memory. The instruction register 12 holds instructions outputted from the instruction buffer 11 until they are decoded or executed. The register designation code identification inquiry unit 13 inquires, when two register designation codes are included in one instruction, as to whether they are equal or not. The instruction decoder 14 decodes instructions held in the instruction register 12 and outputs a control signal to control the operation of each unit of the data processing apparatus. The instruction decoder 14, when the operation code included in an instruction is a predetermined one, conducts different controls (described later) depending on the results inquired by the unit 13: they are equal or different from each other. The detailed description of the construction of the circuit to conduct such control is omitted because the circuit can be a microprogram circuit or a hardware logic circuit as well-known processors can.

Figure 2:
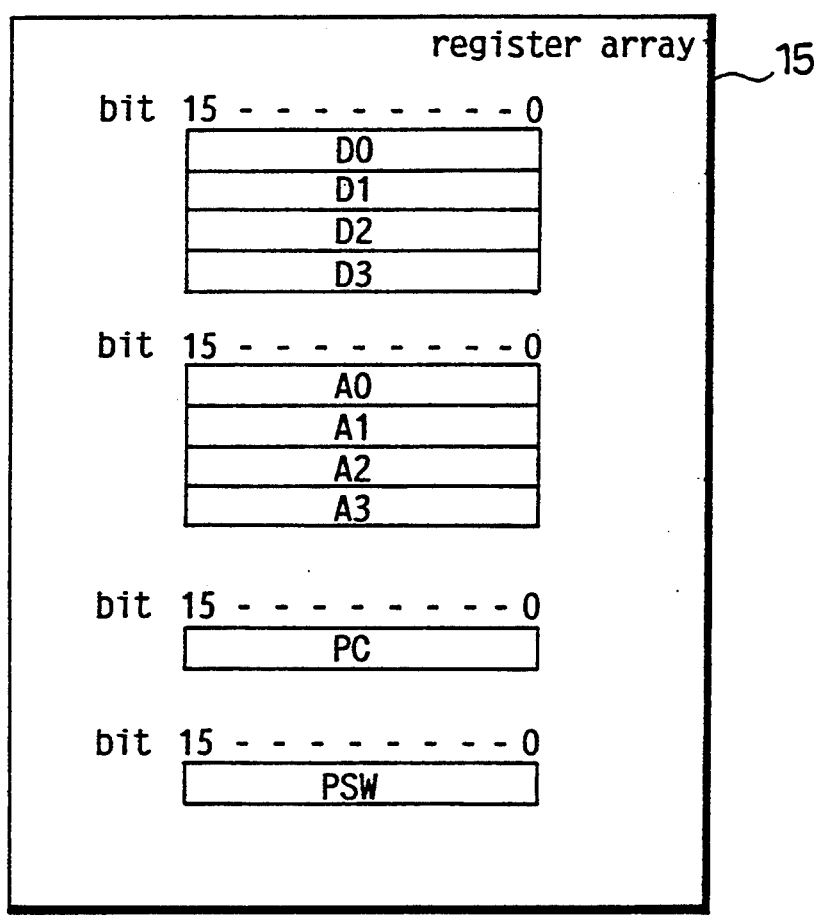
FIG. 2 is an illustration showing the detailed construction of a register array.

The register array 15, as shown in FIG. 2, has a data register group consisting of data registers D0–D3 each having 16-bit length, an address register group consisting of address registers A0–A3, a program counter PC holding the storing address of the instruction in execution, and a status register PSW (processor status word) indicating the status of the data processing apparatus.

The data registers D0–D3 are mainly used for storing data, as working storage. On the other hand, the address registers A0, A1, and A2 are used for storing addresses indicating a source operand, a destination operand, or a frame pointer, A3 being used for storing an address indicating a stack pointer. Although the address registers A0–A2 are usually assigned in the above order when a program is made, their hardware is constructed so that the assignment of the address registers A0–A2 can be flexible and the assignment of the address register A3 can be fixed to use for a stack pointer.

All the data registers D0–D3 and all the address registers A0–A3 are designated by register designation codes of 00–11 (binary characters) in the instruction codes.

Figure 3:
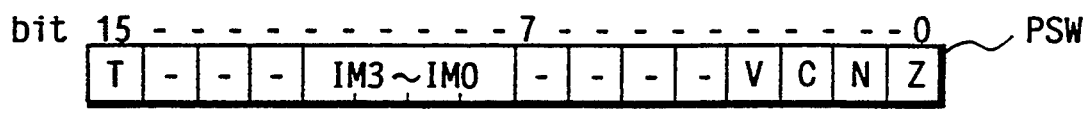
FIG. 3 is an illustration showing the detailed construction of a status register.

The status register PSW, as shown in FIG. 3, consists of a trace flag T designating a single step execution of a program during an operation in a debug mode, interruption mask flags IM3-IM0 designating 16-level interruption masks, an overflow flag V, a carry flag C, a negative flag N, and a zero flag Z all indicating the results of operations.

The execution unit 16 inputs data and addresses outputted from the register array 15, immediate data outputted from the instruction buffer 11, data fetched from the unillustrated memory through the internal data bus 17 and executes predetermined operations such as arithmetic operations, logical operations, and moves according to a control signal from the instruction decoder 14. The results obtained by the execution of the execution unit 16 are moved to the register array 15 and the memory through the bus 17 and held by specific registers corresponding to the instructions or by other units.

The data processing apparatus of this embodiment is further provided with a data bus interface connected to the data bus of the unillustrated external portion of the data processing apparatus, an address bus interface connected to an address bus, and other units. These units are not described here because they are not directly related to this invention.

Figure 4:
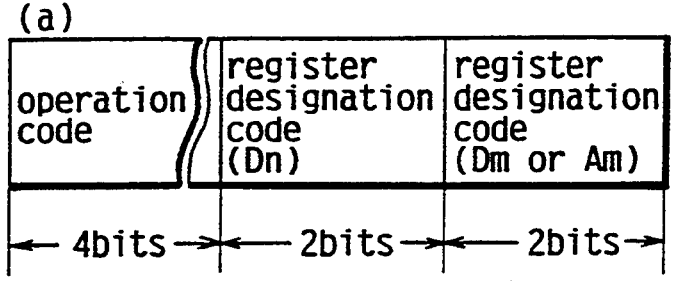
FIG. 4 shows examples of the constructions of instruction codes.
Figure 4:
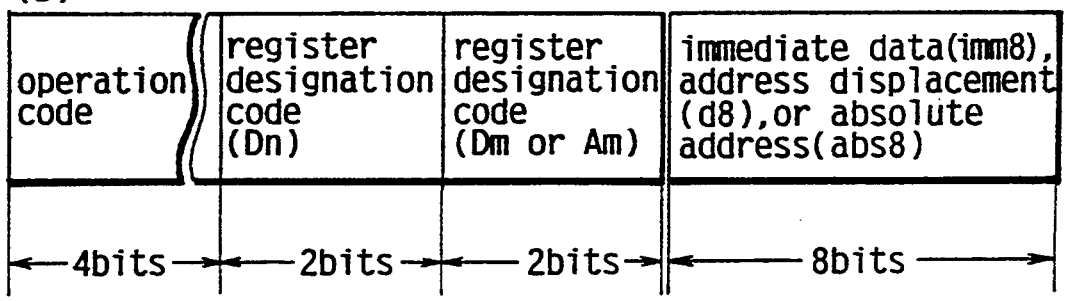
Figure 4:
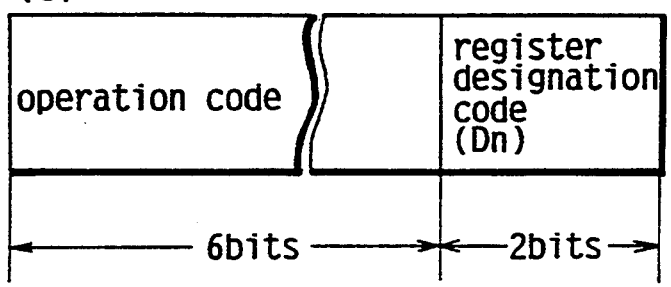
Figure 4:
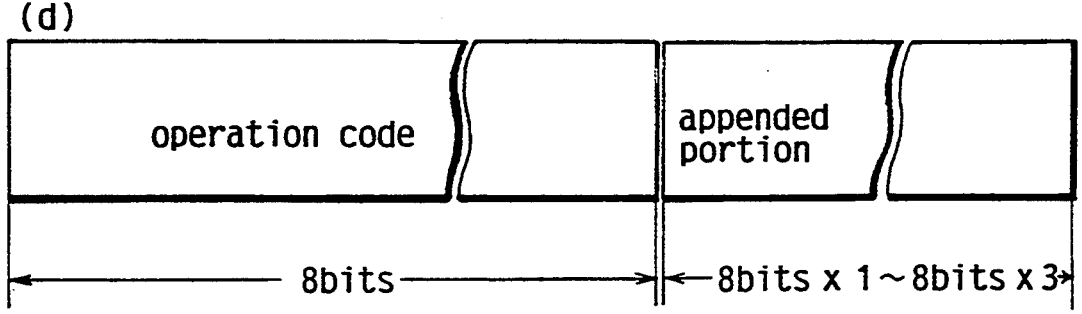

The following is a description of the construction of the instruction code assigned to the data processing apparatus and an example of assigning operations to operation codes with reference to FIGS. 4 and 5. The instruction system described here is a road/store instruction system, which can simplify the construction of the apparatus and easily increase the processing speed, that is, an instruction system capable of mainly moving data between each register and the memory.

FIG. 4 shows examples of the constructions of instruction codes.

The code (a) consists of a 4-bit operation code, two 2-bit register designation codes, Dn and Dm, or Dn and Am (both n and m are integers of 0–3).

The code (b) includes either 8-bit immediate data (imm8), 8-bit displacement of an address (d8), or an 8-bit absolute address (abs8), in addition to the same operation code and the register designation codes as the code (a).

The code (c) consists of a 6-bit operation code and a 2-bit register designation code (Dn).

The code (d) consists of an 8-bit operation code and an appended portion of either 8, 16, or 24 bits such as an expansion instruction, immediate data, or addressing displacement.

In FIG. 5 showing an example of assigning instruction codes, the symbols "*" and "" indicate that any one of the operations shown in the column of operation is executed according to the value of 3-bit or 2-bit respectively.

The following is a description of each instruction code according to each instruction type.

An instruction type [R-R] is a dyadic operation instruction between two data registers and is expressed by an instruction code "O*DnDm" (n≠m). This instruction code indicates 8 different types of operation instructions as follows, depending on the 3-bit values, "*".

(1) Moving data from a data register indicated by the data register designation code Dn (hereinafter referred to as data register Dn) to the data register Dm.
(2) Adding data held in the above data registers without carries.
(3) Subtracting the same without borrows.
(4) Comparing the same.
(5) Adding the same with carries.
(6) Subtracting the same with borrows.
(7) Logically producing the same.
(8) Logically adding the same.

The results of each execution are stored in the data register Dm.

An instruction type [imm8-R] can be distinguished from the instruction type [R-R] because its two register designation codes are equal (n=m). The data register Dn data and 8-bit immediate data (imm8), which follows an instruction code, "O***DnDm" are processed by the same dyadic operation as the instruction type [R-R]. Even if 8-bit immediate data is used for operations, 16-bit data is inputted to the execution unit 16; however, its high-order 8 bits are provided with zero filling (for example in logical operations), sign bit filling (for example in arithmetic operations), or the like, according to the type of the operation.

The instruction types [LD] and [ST] are respectively a data move instruction (load) from the memory to the data register Dn and a reverse data move instruction (store). The sources and destinations in the memory are indicated by 4 types of addressing modes.

The symbol "@" in the column of operation in FIG. 5 is put before the value which is the address of the area to/from which data is moved, and the symbol "(,)" indicates the sum of the values of both sides of comma.

The addressing mode of each move instruction indicates the followings.

(1) When the source or destination of data is "@Am", it represents address register indirect addressing, which has a value stored in the address register Am as its address.

(2) When the source or destination of data is "@(Am, d8)", it represents address register indirect addressing with 8-bit displacement, which uses 8-bit displacement d8 following the instruction codes "1001DnAm" or "1101DnAm", and which has the sum of d8 and a value stored in the address register Am as its address.

(3) When the source or destination of data is "@(Am, D0)", it represents index addressing, which uses the address register Am (m≠3) and the data register D0 (fixed), and which has the sum of a value stored in the address register Am and a value stored in the data register D0.

(4) When the address or addressee of data is "@abs8", it represents 8-bit absolute addressing, which has 8-bit absolute address abs8 following the instruction code as its address.

In the index addressing of (3) above, the address registers A0–A2 are exclusively used, the address register A3 being excepted. This is because this type of addressing is usually used to move data such as strings or arrays, which are rarely moved to the stack area of the memory.

In the 8-bit absolute addressing of (4) above, the register designation code m=3 representing the address register A3 excepted in the index addressing is used as a dummy and an instruction code, where the data register D0 of the source or the destination is definitely used is assigned thereto. When data move is performed in 8-bit absolute addressing, a predetermined value such as "00000000" can be outputted as the high-order 8 bits out of 16-bit address from the data processing apparatus.

An instruction type [R] is a monadic operation instruction assigned to a single data register, and is indicated by the instruction code "1011Dn" or "1111Dn". This code indicates 8 different types of operation instructions: arithmetic shift right (ASR) and left (ASL), rotation right (ROR) and left (ROL), logical reverse (NOT), increment/decrement (INC/DEC), or program interruption (PI), depending on the 2-bit values, "**".

There are two groups of three instruction codes whose high-order 4 bits are respectively "1010" and "1110", which are not assigned any operation in the above example. These instruction codes are used to move their addresses to the address registers A0–A3, to assign unillustrated other instructions, to expand instruction codes to more than 16 bits, and other purposes. Thus, instructions with few frequency of use and with little effect on program sizes can be set as expansion instruction codes. The detailed description of such an expansion is omitted because it is not directly related to this invention.

When an instruction code whose most significant bit is zero, like "01110001" is inputted to the data processing apparatus constructed as above, the register designation code identification inquiry unit 13 compares the least and second least significant bits "01" to the third and forth least significant bits "00", and then outputs a signal indicating that n of Dn and m of Dm are not identical, to the instruction decoder 14.

The unit 14, then, outputs a control signal to the data registers D0 and D1, and makes them output data held in them to the execution unit 16 through the internal data bus 17.

The unit 14 also outputs to the execution unit 16 a control signal by which a logical add operation is executed on the basis of the second, third, and forth most significant bits of the instruction code, "111". Responding to this, the execution unit 16 executes a logical add operation of data outputted from the data register D0 and D1. The results are stored in the data register D1 through the internal data bus 17.

On the other hand, when the data processing apparatus is inputted a code "01110000" and the succeeding 8-bit immediate data, the register designation code identification inquiry unit 13 confirms n and m being equal.

Then, data held in the data register D0 and 8-bit immediate data accumulated in the instruction buffer 11 are inputted to the execution unit 16 through the internal data bus 17, and a logical add operation is executed and the results are stored in the data register D0.

In other words, according to the conventional data processing apparatuses, if two identical register designation codes are used to execute the same operation as non-identical register designation codes, the value of, for example, the data register D0 will not change.

In contrast, according to the data processing apparatus of this invention, 16 types of instructions can be assigned in 3-bit field indicated by the symbol "***" in FIG. 5, by being made to execute a different operation in such a case. Consequently, various types of operations can be performed even if the basic instruction word length is 8 bits. However, some instructions may be designed to execute the same operations as non-identical register designation codes by, for example, using the execution of subtraction in the identical register designation codes as a clear instruction of the register.

In the above case, one register can be designated in a 2-bit field by dividing 8 registers in the register array 15 into two groups having different functions: the data registers D0–D3 and the address registers A0–A3.

Therefore, even if the 8-bit instruction code is made to include two register designation codes: a source register and a destination register, the type of the operation can be designated by the remaining 4 bits long; consequently, various types of operations can be executed in much shorter basic instruction word length. As a result, frequently used eight basic operations such as operations among data registers, operations between the data registers and immediate data, moves between the data registers and the memory, and single-operand operations assigned to one data register can be executed by an instruction having a short word length.

According to the registers and operation instructions of the above construction, an environment of minimum requirements can be provided in order to effectively execute processing by a high-level language such as C language, the sizes of programs can be minimized, and the speed of process can be increased.

Although the immediate data and the absolute address in the instruction codes are 8 bits in length and are expanded to 16 bits long according to the instruction in the above embodiment, 16-bit immediate data may be designed to be used if necessary.

Although the instruction code is decoded into an instruction including an appended portion as immediate data when the two register designation codes are identical in the above embodiment, it may be designed to be decoded into an instruction including an appended portion as an immediate address or an instruction including no appended portion.

Furthermore, this invention is applicable also to the constructions of registers and instruction codes, the types of operations, and bit assignments of operation codes, all of which are different from those in the above embodiment in order to adjust to the various use of the data processing apparatuses.

Moreover, the instruction decoder 14 may be constructed so that it decodes the two register designation codes as different instructions depending on whether they are identical or not, instead of providing the register designation code identification inquiry unit 13.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A data processing unit for compressing an instruction code size comprising:

m data registers for holding data;

n address registers for holding addresses;

means for decoding an instruction, said decoding means decoding an 8-bit instruction comprising a code that designates at least one operation, a $\log_2 m$-bit register-addressing code used to address at least one of said m data registers, and a $\log_2 n$-bit register-addressing code used to address at least one of said n address registers;

means for executing an instruction by computing and transferring data in accordance with a signal decoded by said decoding means, said executing means being connected to said one data register and said one address register, and said executing means transferring data between a memory addressed by said one address register and said one data register; and means for detecting whether the two register addressing codes contained in an 8-bit instruction match or not, said detecting means being connected to said decoding means to output a detection result, wherein said executing means carries out a first process when said detecting means detects a match between said two register-addressing codes, and carries out a second process when said detecting means does not detect a match between said two register-addressing codes.

2. The apparatus of claim 1 wherein an instruction containing immediate data is processed in said first process.

3. The apparatus of claim 2 wherein a register is addressed and a content thereof is compared with the immediate data at said instruction.

4. The apparatus of claim 2 wherein a register is addressed and the immediate data are transferred thereto at said instruction.

5. The apparatus of claim 1 wherein a content of a register addressed by said instruction is shifted to the left by one bit in said second process.

6. The apparatus of claim 1 wherein a content of a register addressed by said instruction is cleared in said second process.

7. A data processing apparatus for executing an 8-bit instruction code, the instruction code comprising a leading bit, three bits which designate any of 8 different types of operation instructions, and two 2-bit register addressing codes, the apparatus comprising:

an instruction buffer for outputting the instruction code;

an instruction register for receiving and holding the instruction code;

determining means connected to the instruction register for determining whether the two 2-bit register addressing codes in the 8-bit instruction code are the same; and an instruction decoder, connected to the instruction register and the determining means, for decoding the instruction code and for outputting a control signal, the control signal being based upon the determination made by the determining means.

8. A data processing apparatus for minimizing the sizes of programs by using relatively short instruction word lengths, the apparatus comprising:

an instruction register for holding an instruction code, the instruction code comprising an operation code that designates an operation, a data register code used to address a data register from a plurality of data registers, and an address register code used to address an address register from a plurality of address registers; and means for determining whether the values of the data register code and address register code match, and for decoding the instruction code, the decoding means interpreting the operation code differently depending on whether a match is found, the decoding means having means for outputting a control signal designating a first type of instruction when the values of the two register designation codes match, and for outputting a control signal designating a second type of operation when the values of the two registers do not match.

* * * * *